United States Patent [19]

Straub

[11] Patent Number: 5,008,068
[45] Date of Patent: Apr. 16, 1991

[54] PLANT COMPRISING A NUCLEAR REACTOR, MORE PARTICULARLY A CONTROL ROD SYSTEM FOR NUCLEAR REACTOR PLANT

[75] Inventor: Hermann Straub, Winterthur, Switzerland

[73] Assignee: Sulzer Brothers Limited, Winterthur, Switzerland

[21] Appl. No.: 264,960

[22] PCT Filed: Jan. 14, 1988

[86] PCT No.: PCT/CH88/00009
§ 371 Date: Sep. 6, 1988
§ 102(e) Date: Sep. 6, 1988

[87] PCT Pub. No.: WO88/05595
PCT Pub. Date: Jul. 28, 1988

[30] Foreign Application Priority Data

Jan. 15, 1987 [CH] Switzerland ............ 00123/87

[51] Int. Cl.$^5$ .................... G21C 7/16; G21C 17/00
[52] U.S. Cl. .................... 376/230; 376/247; 376/258; 376/327
[58] Field of Search .......... 376/230, 231, 203, 283, 376/258, 327, 353, 247

[56] References Cited

U.S. PATENT DOCUMENTS

| | | | |
|---|---|---|---|
| 3,031,397 | 4/1962 | Fortescue et al. | 376/230 |
| 3,442,759 | 5/1969 | Molle et al. | 376/230 |
| 3,462,345 | 8/1969 | Jabsen | 376/230 |
| 3,752,736 | 8/1973 | Kornbichler et al. | 376/230 |
| 4,686,077 | 8/1987 | Straub | 376/230 |

FOREIGN PATENT DOCUMENTS

| | | | |
|---|---|---|---|
| 0204096 | 12/1986 | European Pat. Off. | 376/230 |
| 1178526 | 9/1964 | Fed. Rep. of Germany | 376/231 |
| 3430929 | 3/1986 | Fed. Rep. of Germany . | |
| 3506334 | 8/1986 | Fed. Rep. of Germany | 376/230 |
| 0042788 | 1/1966 | German Democratic Rep. | 376/231 |
| 0131491 | 7/1985 | Japan | 376/230 |

*Primary Examiner*—Harvey E. Behrend
*Attorney, Agent, or Firm*—Kenyon & Kenyon

[57] ABSTRACT

The reactor core of the plant has tubular vertically movable control rods moved by a pressurized flowing coolant. Each control rod so extends around a tubular guide rod which is immobile relatively to the reactor core as to leave a first annular gap between the control rod and the guide rod. The guide rod interior is operative as a first pressure chamber to which the pressurized coolant is supplied. The top end of each control rod is closed and has a vertical spindle which extends into the guide rod interior and co-operates with the guide rod to bound a second annular gap. At least one first restrictor is disposed in the first annular gap and at least one second restrictor is provided in the second annular gap. A second pressure chamber is present between the two restrictors. The coolant inflowing to the guide rod therefore returns by way of the second annular gap, the second pressure chamber and the first annular chamber to the pressure vessel which extends around the reactor core. Control means are provided to enable pressure surges to be produced as required in the coolant in the first pressure chamber.

15 Claims, 3 Drawing Sheets

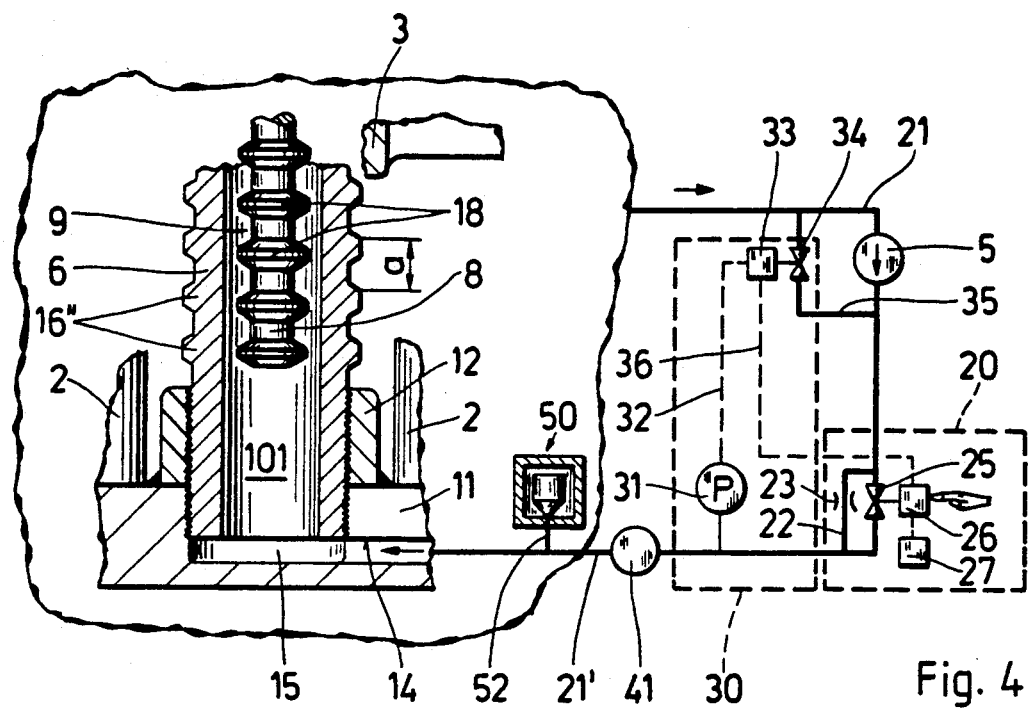
Fig. 4
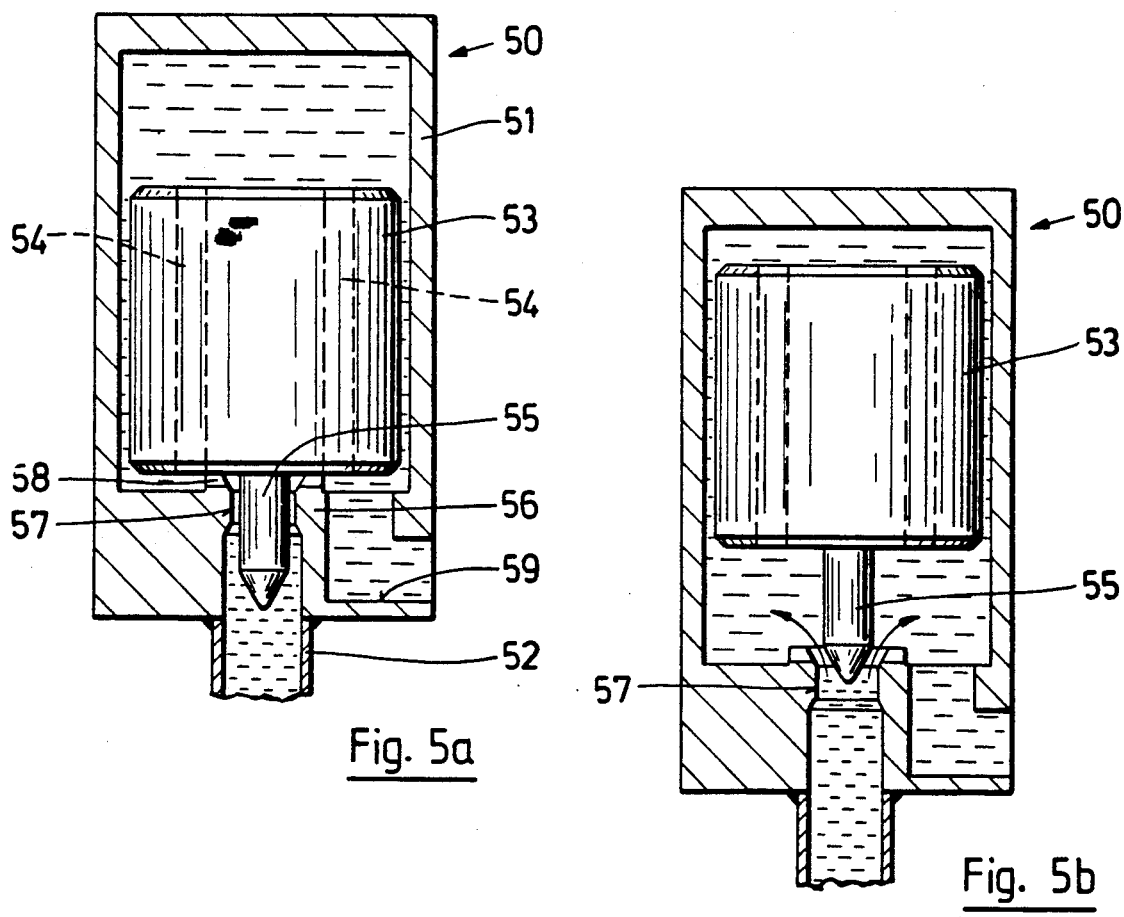
Fig. 5a
Fig. 5b

PLANT COMPRISING A NUCLEAR REACTOR, MORE PARTICULARLY A CONTROL ROD SYSTEM FOR NUCLEAR REACTOR PLANT

This invention relates to a control rod system for a nuclear reactor plant. More particularly, this invention relates to a control rod system for a heating reactor of a nuclear reactor plant.

Heretofore, various types of plants have been known which employ a nuclear reactor, particularly a heating reactor. For example, German OS 3430929 describes a heating reactor plant more particularly a heating reactor, having a pressure vessel receiving a coolant and a reactor core embodied mainly by straight vertical channel-like fuel elements containing fissile material and, disposed between such elements, tubular vertically movable control rods to which absorber rods are secured.

Conveying means are also provided which pressurize coolant from the pressure vessel in order to move the control rods, each control rod so extending around a tubular guide rod which is immobile relative to the fuel elemnets as to leave a first annular gap between the control rod and the guide rod. The guide rod interior is operative as a first pressure chamber and communicates with the delivery side of the conveying means. The top end of the control rod is closed so that the coolant conveyed by the conveying means returns from the first pressure chamber through the first annular gap to the pressure vessel.

The coolant flowing through the first pressure chamber maintains therein a pressure which retains the associated control rod in a particular position which, given a constant delivery of coolant, is substantially constant. The pressure in the first pressure chamber can be altered by altering the delivery of coolant so that the control rod shifts and, if the pressure remains constant, takes up a new position. The reactor power output can therefore be controlled by shifting the control rods. An advantage of the known plant is that there is no appreciable friction when the control rods shift on the guide rods and in the event of a cessation of coolant flow and, therefore, of the rodsupporting pressure, the control rods automatically return to their bottom safety position in which the absorber rods screen the fuel elements from one another so that the nuclear reaction is interrupted. However, control rod position cannot be adapted sufficiently accurately to the associated reactor power output in the known plant. To obviate this disadvantage, the known plant has ultrasonic transmitters which are disposed in the reactor channels above the control rods and which ascertain control rod position and report it to the exterior.

Accordingly, it is an object of the invention to improve the association between a control rod position and reactor power so that control rod position detectors are not required.

It is another object of the invention to permit pressure surges to be produced in a control rod system in a controlled manner.

It is another object of the invention to maintain a control rod in an equilibrium position during normal operating conditions of a reactor plant.

Briefly, the invention provides a nuclear reactor plant which includes a pressure vessel for receiving a coolant, a reactor core including a plurality of vertical fuel elements containing fissile material and tubular control rods which are vertically movable between the fuel elements and which carry absorber rods which are positioned between the fuel elements. In addition, a plurality of fixed guide rods are provided with each guide rod being disposed within a respective control rod to define a first annular gap therebetween and a first pressure chamber between an upper end of the guide rod and the respective control rod. In accordance with the invention, a plurality of vertical spindles are also provided with each spindle being secured to a control rod and depending into a guide rod to define a second annular gap therewith as well as a second pressure chamber below the spindle within the guide rod for receiving a flow of coolant in order to position the control rod relative to the guide rod. In addition, a restrictor is placed in each gap for throttling the flow of coolant therethrough.

The plant is also provided with a conveying means for delivering a flow of pressurized coolant from within the vessel initially into the pressure chamber below each respective spindle in order to move the control rod connected thereto. Control means are also provided for producing surges in the pressure chambers located below the spindles.

With this construction, the control rods are ensured some positional stability against minor pressure variations of the coolant flow since the restrictors restrict the flow of cooling medium into and out of the pressure chambers above the guide rods, with the result that the control rods experience a considerable braking effect opposing their movement. The stability of control rod position is particularly outstanding when an incompressible medium, such as water, is used as coolant, as is usually the case. However, the control means can be used to overcome the stabilizing action described and to move the control rods upwards stepwise by positive pressure surges, corresponding to an abrupt pressure increase, or to move the control rods downwards by negative pressure surges, corresponding to an abrupt pressure decrease. Tests using a control rod of 42 mm diameter and 1 m in length and weighing approximately 20 kg including the absorber rods, with water being used as coolant, have shown that pressure variations of as much as 0.6 bar above and below the set-value pressure in the first pressure chamber cause no appreciable movement of the control rods, positive or negative pressure surges of the order of from 1 to 2 bar being necessary to move the control rods up or down stepwise. In the plant displacement steps of 10 mm have readily been produced.

The restrictors may each take the form of ribs which are disposed on the respective surfaces of the control rod, guide rod and spindle with the respective ribs being equispaced, that is, distributed uniformly lengthwise of the longitudinal axis of the guide rod. This has advantages for both production and operation. If the ribs-and the pressure surges-are shaped and dimensioned appropriately, control rod behaviour can be determined substantially as required within very reduced displacement steps.

The distance between adjacent ribs, which is the same throughout, is approximately 10 millimeters. This is, a preferred between-ribs distance which has proved particularly advantageous.

The restrictors are constructed so that when the control rod is in a stable equilibrium position, the restrictor between the control rod and the guide rod provides an intense restriction while the other restrictor provides little restriction. In response to an upward shift of the control rod from the stable equilibrium position, the restriction provided by the first restrictor decreases while the restriction provided by the second restrictor increases. In response to a downward shift from the stable equilibrium position, the restriction provided by the first restrictor remains substantially the same while the restriction provided by the restrictor between the spindle and the guide rod increases. This construction further improves the positional stability of the control rods.

The control means includes a pressure monitor which is connected to a main control line between the conveying means and a distributor from which as many lines extend as there are control rods. The pressure monitor is constructed to respond to pressures outside a predetermined range by immediately lowering the control rods by causing a pressure decrease in the pressure chambers below the respective spindles. This ensures that the control rods move into the safety position, for example, in the event of a pressure disturbance.

The control means may be so coupled with the pressure monitor that when the control means is actuated to produce a pressure surge, the pressure monitor is inoperative for an optimal time for the pressure surge process. This ensures that the pressure monitor does not disturb the operation of the control means.

The control means may also be constructed to produce pressure surges which are always identical. This provides a reliable and very simple determination of control rod height without the need to place additional equipment inside the pressure vessel. A pressure surge counter may also be provided for counting the number of pressure surges.

Two embodiments of the invention and other advantages will be described in greater detail hereinafter with reference to the drawings wherein.

Figure 1:
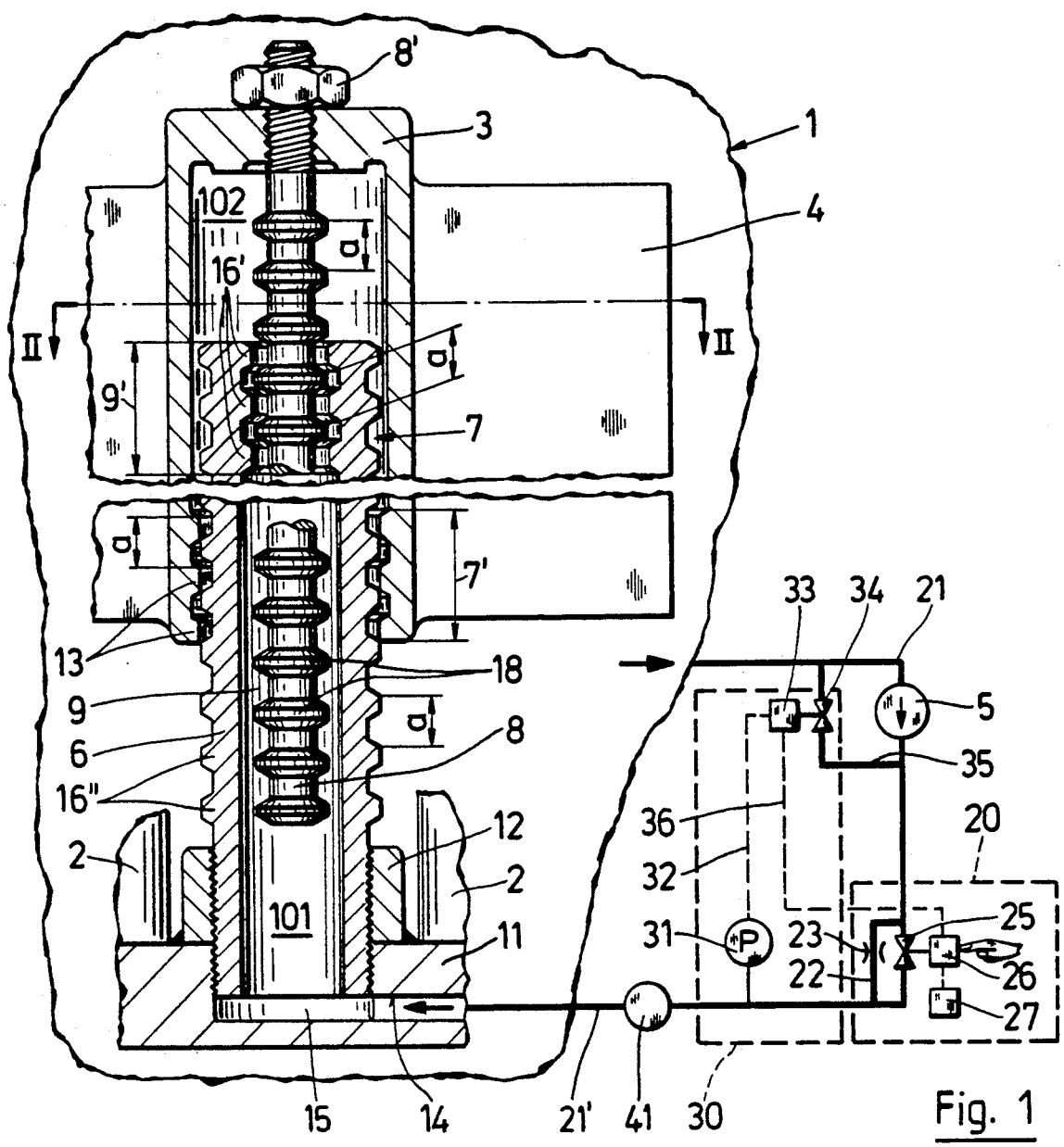
FIG. 1 is a longitudinal section through a guide rod and a control rod together with diagrammatically illustrated conveying and control means and with a pressure monitor.

FIGS. 3a to 3e each show a part of FIG. 1 during different phases of a one-step upwards shift of the control rod;

FIG. 4 is a longitudinal section corresponding to FIG. 1 of a variant, and

FIGS. 5a and 5b each show a detail of FIG. 4 in various operating positions.

Figure 2:
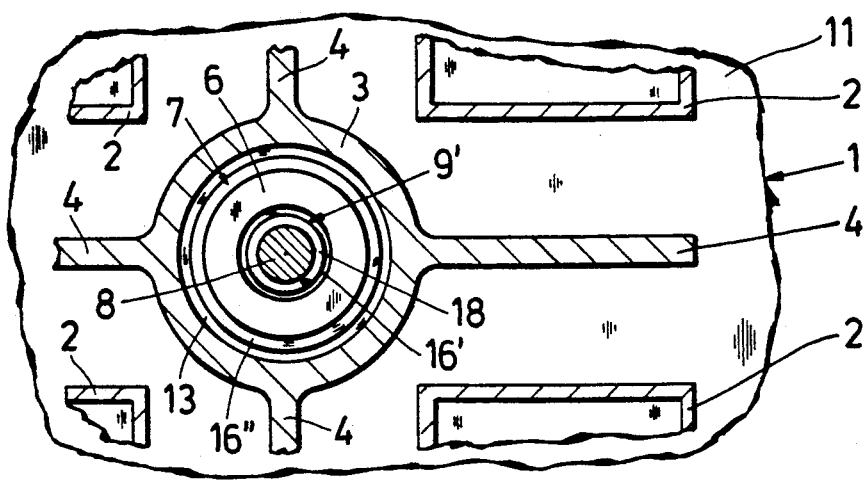
FIG. 2 is a section on the line II—II of FIG. 1.

According to a feature in FIGS. 1 and 2, a plant having a heating reactor comprises a pressure vessel 1, only a part of which is shown. The pressure vessel 1 receives water as coolant and a reactor core embodied mainly by straight vertical channel-like fuel elements 2 containing fissile material and, disposed between such elements, vertically movable control rods 3 to which absorber plates 4 are secured in radiating manner. Each tubular control rod 3 so extends around a tubular guide rod 6 which is immobile relative to the fuel elements 2 as to leave a first annular gap 7 between the control rod 3 and the guide rod 6. Each guide rod 6 is screwed into a vertical bore in a core support plate 11, the rods 6 extending into a pressure enclosure 15 inside the plate 11. For improved support of the rods 6, the vertical bores in the plate 11 are prolonged upwards by means of sleeves 12. A main control line 21 connected to the pressure vessel interior has a pump 5 operative as coolant-conveying means and, by way of a distributor 41 from which as many control lines 21' start as there are control rods 3, communicates on the delivery side with channels 14 which are present in the plate 11 and which extend into the pressure enclosures 15. The top end of each rod 3 is closed and carries in each case a spindle 8 which is screwed to such end and secured by means of a nut 8', the spindle extending into the guide rod 6 and co-operating therewith to bound a second annular gap 9.

Three circular ribs 13 which extend into the first annular gap 7 and which are disposed perpendicularly to the guide rod 6 longitudinal axis are provided at the bottom end of the control rod inside surface. Similarly, the top end of the inside surface of the guide rod 6 is fashioned with three circular ribs 16' which extend into the second annular gap 9 and which are disposed perpendicularly to the guide rod longitudinal axis. Ribs 16" are present along the entire outside surface of guide rod 6 and ribs 18 are present along the whole length of the spindle 8. The ribs 13, 16', 16", 18 are distributed uniformly so that the verical distance a between adjacent ribs 13, 16', 16", 18, the same being fixedly disposed relatively to one another, is everywhere the same. The control rod ribs 13 and the ribs 16" on the outside surface of the guide rod 6 co-operate to form a first restrictor 7' while the ribs 16' on the inside surface of the guide rod 6 and the ribs 18 on the spindle 8 co-operate to form a second restrictor 9'. A first pressure chamber 101 is disposed inside the guide rod 6 below the spindle 8, and a second pressure chamber 102 is provided between the first restrictor 7' and the second restrictor 9'. When the control rod 3 is in a stable equilibrium position, the bottom flank of each control rod rib 13 is substantially flush in the first restrictor 7' with the top flank of a rib 16" on the guide rod outside surface and the ribs 16' on the guide rod inside surface are disposed at a height substantially midway between two adjacent ribs 18 of the spindle 8. Consequently, in the stable equilibrium position (FIGS. 1 and 3a) the first restrictor 7' provides substantial restriction whereas the second restrictor 9' has its minimum restrictive effect, so that the pressure which exists in the second pressure chamber 102 and which supports the control rod 3 is maintained.

Disposed in the main control line 21 are control means 20 comprising: a control valve 25 disposed downstream of the pump 5; a manually operated quick-acting valve drive 26 for the control valve 25; and a counter 27 which is actuated at each actuation of the valve 25 by the drive 26. A bypass 22 comprising a restrictor 23 extends around the valve 25.

The plant also has a pressure monitor 30 which is connected to the main control line 21 and which comprises a manometer 31, a signal line 32 and a valve control 33 which acts on a quickacting on/off type emergency valve 34 in a return line 35 connected to the pump 5. The valve control 33 is so adjusted that when the manometer 31 measures a pressure outside a predetermined pressure range, the emergency valve 34 opens immediately. The water delivered by the pump 5 is mostly recirculated via the return line 35, the pressure in the guide rods 6 dropping to such a low value that the control rods 3 drop immediately into their bottom safety position.

By way of a control line 36, the valve control 33 is so connected to the valve drive 26 that at each actuation of the drive 26 the valve control 33 is inoperative for an optimal time for the pressure surge process.

Preferably, the valve drive 26 is press-button-operated, a timer (not shown in FIG. 1) being used to ensure a constant actuation time of the valve 25 irrespective of button-pressing.

The plant described operates as follows:

In normal operation, the pump 5 delivers water from the pressure vessel interior through the main control line 21, control lines 21', channels 14 and pressure enclosures 15 to the first pressure chamber 101, the control valve 25 being adjusted appropriately for the required quantity of water and the emergency valve 34 being in the closed state. The water flows from the first pressure chamber 101 through the second annular gap 9 and through the second restrictor 9' to the second pressure chamber 102 whence the water returns through the first annular gap 7 and the first restrictor 7' to the pressure vessel interior. In this operative state, the control rod 3 is in a stable equilibrium position in which, because of the arrangement of the ribs 13, 16', 16", 18, the second restrictor 9' provides minimum restriction and the first restrictor 7' is providing substantial restriction, the pressure which the pump 5 produces being transmitted to the second pressure chamber 102 with only minor losses. The control rod 3 therefore rests in a stable position on the pressurized water. If the water pressure gradually increases or if a corresponding external force acts on the control rod 3, the same rises a little, in which case the flow resistance in the second restrictor 9' increases and the flow resistance in the first restrictor 7' decreases, so that water flows from the second pressure chamber 102 to the pressure vessel interior and the pressure supporting the control rod 3 drops, the same returning to the stable equilibrium position. When, however, the control rod 3 is affected by a gradual pressure decrease or a corresponding external force, the control rod 3 moves down a little. The restriction provided by the second restrictor 9' therefore increases and the restriction provided by the first restrictor 7' remains the same. The water in the second pressure chamber 102 backs up and the pressure therein rises, so that the control rod 3 is returned upwardly to the stable equilibrium position. Because of the incompressibility of water, the effects just described occur very rapidly and the movements of the control rod 3 are insignificant.

Figure 3A:
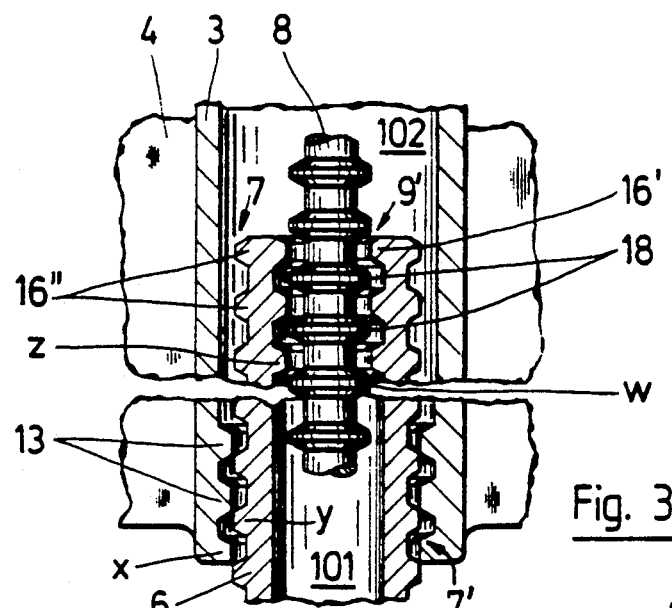
Figure 3B:
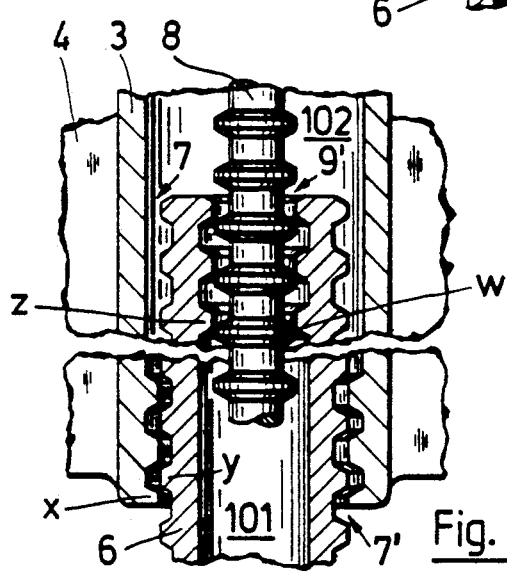
Figure 3C:
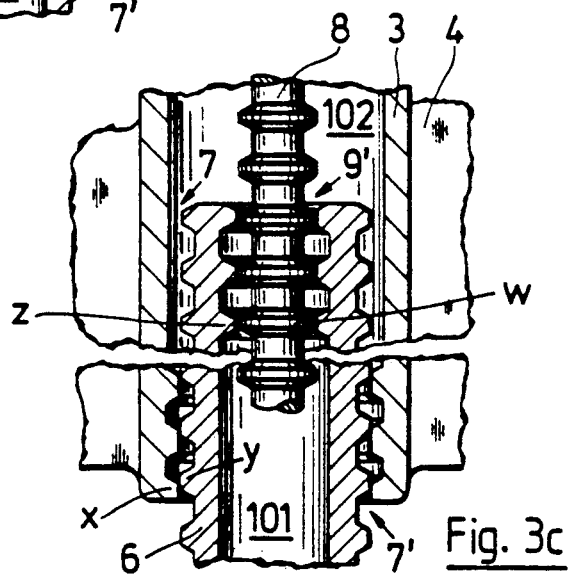
Figure 3D:
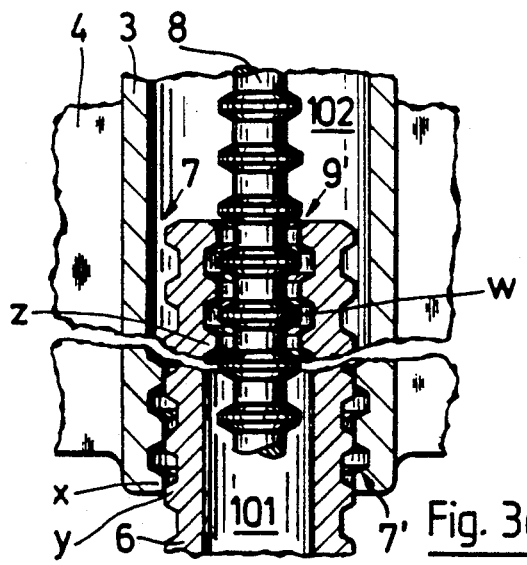
Figure 3E:
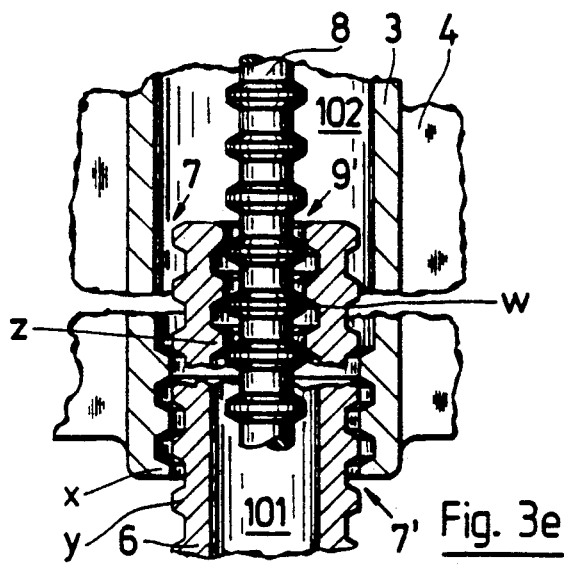

To raise the control rod 3 by one step, the valve 25 is briefly opened by actuation of the drive 26. The resulting brief increase in the quantity of water acts by way of the control lines 21', channels 14 and pressure enclosures 15 to produce a positive pressure surge in the first pressure chamber 101. The pressure surge is sufficient to overcome the stabilizing effect, hereinbefore described, of the first and second restrictors 7', 9', the control rod 3a moving up by one step as shown in FIGS. 3a to 3e; the rod 3 initially moves so far from the equilibrium position, shown in FIG. 3a, that in the first restrictor 7' each rib (x) of the rod 3 reaches substantially the center between two ribs 16" (y) on the outside surface of the guide rod 6, as shown in FIG. 3b, the restriction which is provided by the restrictor 7' decreasing. Simultaneously the ribs 18 (w) move in the second restrictor 9' from their central position towards the ribs 16' (z) so that the restriction provided by the second restrictor 9' increases, as shown in FIG. 3b. The pressure in the second pressure chamber 102 therefore decreases, with a braking effect on the rod 3. Nevertheless, the rod 3 continues to rise by inertia into the position which is shown in FIG. 3c and in which both the ribs 13 (x), 16" (y) of the first restrictor 7' and the ribs 16' (z), 18 (w) of the second restrictor 9' provide maximum restriction. However, the relatively low pressure in the second pressure chamber 102 still remains low and therefore continues to have a braking effect on the control rod 3. The dimensioning and arrangement of the ribs 13, 16', 16" and 18 are such that as the control rod 3 rises further, first the second restrictor 9' and later the first restrictor 7' cease to provide maximum restriction (FIG. 3d). Before the first restrictor 7' ceases to provide maximum restriction, higher-pressure pressure medium from the first pressure chamber 101 enters the second pressure chamber 102 so that the control rod 3 cannot drop back into its former position. However, this occurs for only a very brief time. The first restrictor 7' then moves into a position to provide a minimum restriction and which is shown in FIG. 3e. The control rod 3, which has moved into too high a position, is definitely retarded and drops back into the new equilibrium position one step higher than the previous equilibrium position. The new position corresponds to the equilibrium position of FIG. 3a except that the ribs 13, 18 are positioned one step higher relative to the ribs 16", 16' respectively than before the pressure surge, as can be gathered from the ribs marked x, y, z and w in FIGS. 3a to 3e. Control rod behaviour is mainly determined by control rod shape, self-weight, the magnitude and duration of the pressure surge, the shape of the ribs 13, 16', 16", 18 and the pressures present in the plant.

The control rod 3 behaves similarly in the case of a downwards shift, a negative pressure surge being produced in this case by a brief closure of the valve 25. The bypass 22 comprising the restrictor 23 maintains a reduced flow of water to obviate uncontrolled dropping of the control rod 3 into the bottom position.

At each actuation of the valve drive 26, the counter 27 is actuated to count the corresponding pressure surges. Since one-step displacement of the control rod 3 follows each such surge, control rod position can be ascertained just by counting the positive and negative pressure surges. The counter 27 can be connected to a register giving a direct indication of control rod position. The valve drive 26 together with the signals from the manometer 31 may act on the counter 27 by way of an AND-gate so that only pressure surges which have actually occurred are counted. Also, the control means 20 must be so devised that the counter is automatically reset to zero at each operation of the emergency valve 34.

Referring to FIG. 4, as an extra safety feature, a pressure relief element 50 is connected to the control line 21' extending to the first pressure chamber 101. One such element 50 is provided for each control rod 3.

Referring to FIG. 5a, the element 50 has a cylinder 51 which is closed at the top end and which communicates at a bottom end by way of a port 52 with the control line 21'. A piston 53 is disposed in the cylinder 51, can reciprocate vertically therein and is formed off center with axial passages 54. The piston 53 has a coaxial restrictor pin 55 at the bottom end whose cylindrical length corresponds to the distance a between two equilibrium positions of the control rod 3. A coaxial restriction 57 in the base 56 of the cylinder 51 extends around the pin 55 and provides communication between the port 52 and the cylinder interior. Extending around the top end of the restriction 57 are radial ribs 58 on which the piston 53 rests when the control rod 3 is in an equilibrium position. Laterally of the restriction 57, there is a passage 59 in the cylinder base 56, the passage 59 connecting the cylinder interior to the pressure vessel interior.

The weight of the piston 53 is such as to exceed the hydraulic pressure present in the restriction 57 when the control rod 3 is in the equilibrium position. However, the weight is less than the hydraulic pressure needed to raise the rod 3 from the equilibrium position into the immediately higher step.

Consequently, in response to a positive pressure surge produced normally by opening of the valve 25, the pressure in the control line 21' rises and causes the control rod 3 and piston 53 to rise substantially simultaneously with one another. When the pin 55 disengages from the restriction 57, as shown in FIG. 5b, the pressure in the control line 21' drops to the level at which the piston 53 disengaged from the ribs 58. The pressure in the control line 21' is therefore reduced automatically irrespective of whether the valve 25 closes simultaneously or with some delay or even not at all. The pressure reduction continues until the pressure in the control line 21' has undershot the pressure required to raise the piston 53. Even when the control valve 25 closes normally, the pressure in the control line 21' drops to the pressure normally associated with the equilibrium position, so that the piston 53 also drops back into its stable bottom position shown in FIG. 5a.

The effect of the pressure relief element 50 is therefore that even when the control valve 25 does not operate normally, for instance, in the event of the valve 25 closing or sticking and therefore not closing at all, the control rod always takes up an equilibrium position. Also, one further pressure relief element each can be provided below the first pressure chamber 101 and/or at the top end of the control rod.

I claim:

1. In a nuclear reactor plant, the combination comprising
   a pressure vessel for receiving a coolant;
   a reactor core in said vessel including a plurality of vertical fuel elements containing fissile material;
   tubular vertically movable control rods between said fuel elements, each rod having a coaxial blind bore therein;
   absorber plates secured to said control rods and extending between said fuel elements;
   a plurality of fixed hollow guide rods, each guide rod being disposed within said bore of a respective control rod to define a first pressure chamber between an upper end of said guide rod and said respective control rod and a first annular gap therebetween communicating said chamber with an interior of said pressure vessel;
   a plurality of vertical spindles, each spindle being secured to and within a respective control rod and depending into a respective guide rod to define a second pressure chamber below a lower end of said spindle within said guide rod and a second annular gap communicating said second chamber with said first chamber;
   a first restrictor in said first gap to restrict a flow of coolant therethrough;
   a second restrictor in said second gap to restrict a flow of coolant therethrough;
   conveying means for delivering a flow of pressurized coolant from within said vessel into said second pressure chamber below each respective spindle to vertically move said control rod connected thereto relative to said fuel elements; and
   control means for producing pressure surges in said second pressure chamber.

2. The combination as set forth in claim 1 wherein said first restrictor includes a plurality of equi-spaced ribs on a respective control rod facing a plurality of equi-spaced ribs on a respective guide rod and said second restrictor includes a plurality of equi-spaced ribs on a respective guide rod facing a plurality of equi-spaced ribs on a respective spindle.

3. The combination as set forth in claim 2 wherein said ribs are longitudinally spaced apart on said respective rods and said spindles approximately 10 millimeters.

4. The combination as set forth in claim 1 wherein with a respective control rod in a equilibrium position, said first restrictor provides intense restriction and said second restrictor provides little restriction, whereby in response to an upward shift of said control rod from said equilibrium position, said restriction of said first restrictor decreases and said restriction of said second restrictor increases and in response to a downward shift of said control rod from said equilibrium position, said restriction of said second restrictor increases.

5. The combination as set forth in claim 1 wherein said conveying means includes a control line for coolant flow and a distributor connected between said control line and said second pressure chamber of each guide rod, and wherein said control means includes a pressure monitor in said control line for responding to pressures outside a predetermined range to cause a pressure decrease in said second pressure chamber of each guide rod to immediately lower said control rods.

6. The combination as set forth in claim 1 wherein said control mean includes a pressure surge counter.

7. The combination as set forth in claim 1 which further comprises at least one pressure relief element communicating with a respective second pressure chamber, said pressure relief element being responsive to a pressure in said second pressure chamber sufficient to raise said control rod from a first equilibrium position to a second equilibrium position.

8. The combination as set forth in claim 7 wherein said pressure relief element includes a cylinder communicating with the interior of said pressure vessel, a port in said cylinder communicating the interior of said cylinder with said second chamber a piston slidably mounted vertically in said cylinder and a restrictor pin on said piston coaxial of said port, said pin being movable from a first position in said port with said control rod in a first equilibrium position to a second position outside said port with said control rod in a second equilibrium position.

9. In a nuclear reactor plant, the combination comprising
   a hollow guide rod;
   a vertically movable closed-ended control rod about said guide rod to define a first pressure chamber between an upper end of said guide rod and said control rod and a first annular gap therebetween communicating said first chamber with the exterior of said guide rod and said control rod;
   a spindle secured to and within said control rod and depending into said guide rod to define a second annular gap in communication with said first pressure chamber and a second pressure chamber below said spindle within said guide rod and in communication with said second gap for receiving a flow of coolant to position said control rod relative to said guide rod and to deliver the flow of coolant to said second gap.

a first restrictor in said first gap to restrict a flow of coolant therthrough; and a second restrictor in said second gap to restrict a flow of coolant therethrough.

10. The combination as set forth in claim 9 which further comprises conveying means for delivering a flow of pressurized coolant into said second chamber and control means for producing pressure surges in said second pressure chamber.

11. The combination as set forth in claim 10 wherein with said control rod in an equilibrium position, said first restrictor provides intense restriction and said second restrictor provides little restriction, whereby in response to an upward shift of said control rod from said equilibrium position, said restriction of said first restrictor decreases and said restriction of said second restrictor increases and in response to a downward shift of said control rod from said equilibrium position, said restriction of said second restrictor increases.

12. The combination as set forth in claim 10 wherein said conveying means includes a control line for coolant flow and said control means includes a pressure monitor in said control line for responding to pressures outside a predetermined range to cause a pressure decrease in said second pressure chamber of said guide rod to immediately lower said control rods to immediate lower said control rod.

13. The combination as set forth in claim 10 which further comprises a pressure relief valve communicating with said second pressure chamber, said element including a cylinder having an outlet passage, a port in said cylinder communicating said cylinder with said second chamber, a piston slidably mounted vertically in said cylinder and a restrictor pin on said piston coaxial of said port, said pin being movable from a first position in said port with said control rod in a first equilibrium position to a second position outside said port with said control rod in a second equilibrium position.

14. The combination as set forth in claim 9 wherein said first restrictor includes a plurality of equi-spaced inwardly directed ribs on said control rod and a plurality of equi-spaced outwardly directed ribs on said guide rod in facing relation to said control rod.

15. The combination as set forth in claim 9 wherein said second restrictor includes a plurality of equi-spaced ribs disposed along said spindle and a plurality of equi-spaced inwardly directed ribs at an upper end of said guide rod.

* * * * *

UNITED STATES PATENT AND TRADEMARK OFFICE
CERTIFICATE OF CORRECTION

PATENT NO. : 5,008,068

DATED : April 16, 1991

INVENTOR(S) : HERMANN STRAUB

It is certified that error appears in the above-identified patent and that said Letters Patent is hereby corrected as shown below:

```
Column 1, line 24 change "elemnets" to -elements-
Column 2, line 63 cancel ","
Column 6, line 58 change "off center" to - off-center -
Column 7, line 16 change "disengaged" to -diengages-
Column 8, line 15 change "a" to -an-
Column 8, line 34 change "mean" to -means-
Column 10, lines 2 and 3 cancel "rods to ... control"
```

Signed and Sealed this

Eighth Day of December, 1992

*Attest:*

DOUGLAS B. COMER

*Attesting Officer*　　　*Acting Commissioner of Patents and Trademarks*